(12) United States Patent
Nagatani

(10) Patent No.: US 9,588,409 B2
(45) Date of Patent: Mar. 7, 2017

(54) PROJECTOR HAVING AN ILLUMINATION UNIT AND A PROJECTION UNIT FIXED OR SHIFTABLY HELD TO A BASE FRAME

(71) Applicant: Seiko Epson Corporation, Tokyo (JP)

(72) Inventor: Kaname Nagatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 64 days.

(21) Appl. No.: 14/641,524

(22) Filed: Mar. 9, 2015

(65) Prior Publication Data

US 2015/0268536 A1    Sep. 24, 2015

(30) Foreign Application Priority Data

Mar. 19, 2014    (JP) .................................. 2014-056095

(51) Int. Cl.
 G03B 21/14    (2006.01)
 G03B 21/16    (2006.01)
 G03B 21/20    (2006.01)
(52) U.S. Cl.
 CPC ........... *G03B 21/142* (2013.01); *G03B 21/16* (2013.01); *G03B 21/2046* (2013.01); *G03B 21/2066* (2013.01)
(58) Field of Classification Search
 CPC .... G03B 21/28; G03B 21/145; G03B 21/142; G03B 21/208; H04N 9/315; H04N 9/3141
 See application file for complete search history.

(56) References Cited

U.S. PATENT DOCUMENTS

| 2005/0151935 | A1* | 7/2005 | Ariyoshi | G03B 21/10 353/79 |
| 2005/0248731 | A1* | 11/2005 | Jung | G03B 21/10 353/79 |
| 2010/0097816 | A1* | 4/2010 | Chen | H04N 9/315 362/418 |
| 2010/0296066 | A1* | 11/2010 | Ou Yang | F21V 14/06 353/119 |
| 2011/0063586 | A1* | 3/2011 | Amano | G03B 21/005 353/99 |
| 2013/0002971 | A1* | 1/2013 | Kadotani | G02B 27/102 349/5 |

FOREIGN PATENT DOCUMENTS

| CN | 200982477 Y | 11/2007 |
| JP | 4035387 B | 1/2008 |
| JP | 2013-88743 A | 5/2013 |

* cited by examiner

*Primary Examiner* — Sultan Chowdhury
(74) *Attorney, Agent, or Firm* — ALG Intellectual Property, LLC

(57) ABSTRACT

A projector includes an illumination unit which has an optical system including a light source apparatus, an image formation unit which has an optical system including a light modulator (liquid crystal panels), a projection unit which has an optical system including a projection lens, to which the image formation unit is coupled, and which is coupled to the illumination unit, and a base frame which fixes one of the illumination unit and the projection unit and holds the other shiftably in a direction parallel to a projection direction. In a case where the projection unit is fixed to the base frame, second fixing portions (projection unit fixing portions) of the projection unit are fixed, and first fixing portions (illumination unit fixing portions) of the illumination unit are shiftably held.

9 Claims, 7 Drawing Sheets

PROJECTOR HAVING AN ILLUMINATION UNIT AND A PROJECTION UNIT FIXED OR SHIFTABLY HELD TO A BASE FRAME

BACKGROUND

1. Technical Field

The present invention relates to a projector.

2. Related Art

There is a known projector of related art in which light outputted from a light source apparatus is modulated by a light modulator in accordance with image information and the modulated light is projected through a projection lens onto a projection surface.

JP-A-2013-88743 discloses a projector including a controller having a normal mode in which a light source and a light modulator are cooled by controlling the speed of rotation of a cooling fan and an auxiliary mode in which the speed of rotation of the cooling fan is controlled to differ from the speed of rotation in the normal mode based on the temperature in an exterior enclosure after the projector is activated. In a situation in which constituent members of the projector expand due to an increase in the temperature of the light source and therefore shift a projection position, the configuration described above quickly achieves a balanced state in the enclosure by using the auxiliary mode to shorten the period required to adjust the projection position.

FIGS. 6A to 6C are cross-sectional views diagrammatically showing a schematic configuration of a projector 9 of related art. FIG. 6A shows a state immediately after projection starts. FIG. 6B shows a first state after the projection starts. FIG. 6C shows the following state after the projection starts. FIG. 7 shows a change in the projection position due to an increase in temperature in the projector 9 of related art. In FIG. 7, the horizontal axis (X axis) represents elapsed time (in minutes) immediately after the projection starts, and the vertical axis (Y axis) represents the amount of change in the projection position immediately after the projection starts. FIG. 7 shows a result of an experiment conducted by the present inventor. The graph in FIG. 7 is drawn with reference to the projection position at the time when the projection starts (0 minutes). The Y axis shown in FIG. 7 represents the amount of change in the projection position in the form of the number of shifted pixels, but the number of pixels and other parameters are not numerically shown.

The projector 9 of related art includes an illumination unit 90, which has an optical system including a light source apparatus 901, an image formation unit 91, which has an optical system including a light modulator 911, a projection unit 92, which has an optical system including a projection lens 921, and a frame 93, which fixes the illumination unit 90 and the projection unit 92, as shown in FIGS. 6A to 6C. The image formation unit 91 is coupled to the projection unit 92, and the projection unit 92 to which the image formation unit 91 has been coupled is coupled to the illumination unit 90.

A plurality of fixing portions 902, which are formed all around the exterior of the illumination unit 90, fix the illumination unit 90 to the frame 93. The projection unit 92 is also fixed to the frame 93 via a plurality of fixing portions 922. Each of an enclosure that forms the illumination unit 90 and the frame 93 is formed of a synthetic resin member.

In general, a projector has a heat generation source, such as a power supply and a light source apparatus. After the light source apparatus is turned on to start projection, the temperature of each constituent member that forms the projector gradually increases from a start temperature equal to the temperature in the environment where the projector is installed. Each constituent member that forms the projector is primarily made of a synthetic resin and therefore expands/contracts as the temperature changes, and the modulus of elasticity of the synthetic resin also changes with temperature.

In the projector 9 immediately after the projection starts, the temperature of each constituent member is equal to the temperature in the environment, and the constituent member does not deform due to expansion and is held in an intended position thereof, as shown in FIG. 6A. In this state, an image (modulated light) is precisely projected in a projection position set on a screen (not shown).

In the first stage after the projection starts, however, when the temperature of the illumination unit 90 including the light source apparatus 901 increases, the enclosure that forms the illumination unit 90 expands and the modulus of elasticity of the enclosure decreases. The expansion, the decrease, and the self-weight of the projection unit 92 deform the projection unit 92 in such a way that it is gradually inclined downward, as shown in FIG. 6B. FIG. 7 shows that the projection position gradually shifts downward immediately after the projection starts. Thereafter, when the temperature of the frame 93 increases, the projection unit 92 now conversely deforms in such a way that it is inclined upward, as shown in FIG. 6C. FIG. 7 shows that after the projection starts, the projection position shifts downward, reaches the lowest position in about 6 minutes, and then conversely shifts upward.

As described above, when the temperature of the illumination unit 90 first increases, the projection position undesirably shifts downward, and when the temperature of the frame 93 increases after a time lag, the projection position undesirably shifts upward. In either case, after the projection starts, the constituent members expand due to an increase in temperature and deform accordingly, undesirably resulting in a change in (displacement of) the projection position.

A projector that accommodates deformation of constituent members due to a change in temperature to suppress displacement in the projection position has therefore been desired.

SUMMARY

An advantage of some aspects of the invention is to solve at least a part of the problems described above, and the invention can be implemented in the following aspects or application examples.

APPLICATION EXAMPLE 1

A projector according to this application example is a projector in which light outputted from a light source apparatus is modulated by a light modulator in accordance with image information and the modulated light is projected through a projection lens onto a projection surface, the projector including (a) an illumination unit which has an optical system including the light source apparatus, (b) an image formation unit which has an optical system including the light modulator, (c) a projection unit which has an optical system including the projection lens, to which the image formation unit is coupled, and which is coupled to the illumination unit, and (d) a base frame which fixes one of the illumination unit and the projection unit and holds the other shiftably in a direction parallel to a projection direction.

According to the projector described above, for example, in a case where the illumination unit is fixed to the base frame, the projection unit is allowed to shift in the direction parallel to the projection direction, whereby deformation due to expansion of the constituent members that occurs when the temperatures of the constituent members increase after the projection starts can be accommodated. Further, for example, in a case where the projection unit is fixed to the base frame, the illumination unit is allowed to shift in the direction parallel to the projection direction, whereby deformation due to expansion of the constituent members that occurs when the temperatures of the constituent members increase after the projection starts can be accommodated. Therefore, deformation of the constituent members due to a change in temperature can be accommodated, whereby the projector achieved in the present application example can suppress displacement of the projection position.

APPLICATION EXAMPLE 2

In the projector according to the application example described above, it is preferable that the illumination unit includes a plurality of first fixing portions fixed to or shiftably held on the base frame, that the projection unit includes a plurality of second fixing portions fixed to or shiftably held on the base frame, that the base frame includes a plurality of third fixing portions that are provided in correspondence with the first fixing portions and the second fixing portions and fix or shiftably hold the first fixing portions or the second fixing portions, and that in a case where the projection unit is fixed to the base frame, the second fixing portions in the projection unit are fixed and the first fixing portions in the illumination unit are shiftably held.

According to the projector described above, in a case where the projection unit is fixed to the base frame, the second fixing portions are fixed, and the first fixing portions in the illumination unit shift in the direction parallel to the projection direction with reference to the fixed second fixing portions.

As a result, deformation of the constituent members that occurs when the temperatures of the constituent members increase can be maintained at an acceptable level with reference to the fixed second fixing portions. Therefore, deformation of the constituent members due to a change in temperature can be accommodated, whereby the projector achieved in the present application example can suppress displacement of the projection position.

APPLICATION EXAMPLE 3

In the projector according to the application example described above, it is preferable that the illumination unit includes a plurality of first fixing portions fixed to or shiftably held on the base frame, that the projection unit includes a plurality of second fixing portions fixed to or shiftably held on the base frame, that the base frame includes a plurality of third fixing portions that are provided in correspondence with the first fixing portions and the second fixing portions and fix or shiftably hold the first fixing portions or the second fixing portions, and that in a case where the illumination unit is fixed to the base frame, the first fixing portions in the illumination unit are fixed and the second fixing portions in the projection unit are shiftably held.

According to the projector described above, in a case where the illumination unit is fixed to the base frame, the first fixing portions are fixed, and the second fixing portions in the projection unit shift in the direction parallel to the projection direction with reference to the fixed first fixing portions.

As a result, deformation of the constituent members that occurs when the temperatures of the constituent members increase can be maintained at an acceptable level with reference to the fixed first fixing portions. Therefore, deformation of the constituent members due to a change in temperature can be accommodated, whereby the projector achieved in the present application example can suppress displacement of the projection position.

APPLICATION EXAMPLE 4

In the projector according to the application example described above, it is preferable that the illumination unit includes a plurality of first fixing portions fixed to or shiftably held on the base frame, that the projection unit includes a plurality of second fixing portions fixed to or shiftably held on the base frame, that the base frame includes a plurality of third fixing portions that are provided in correspondence with the first fixing portions and the second fixing portions and fix or shiftably hold the first fixing portions or the second fixing portions, and that in a case where the illumination unit is fixed to the base frame, among the plurality of first fixing portions in the illumination unit, a first fixing portion located in the vicinity of the projection unit is fixed, the other first fixing portions are shiftably held, and the second fixing portions in the projection unit are shiftably held.

According to the projector described above, in a case where the illumination unit is fixed to the base frame, a first fixing portion in the illumination unit that is located in the vicinity of the projection unit is fixed, whereby the other first fixing portions in the illumination unit shift in the direction parallel to the projection direction with reference to the fixed first fixing portion.

Further, the second fixing portions in the projection unit shift in the direction parallel to the projection direction with reference to the fixed first fixing portion.

As a result, deformation of the constituent members that occurs when the temperatures of the constituent members increase can be maintained at an acceptable level with reference to the fixed first fixing portion. Therefore, deformation of the constituent members due to a change in temperature can be accommodated, whereby the projector achieved in the present application example can suppress displacement of the projection position.

APPLICATION EXAMPLE 5

In the projector according to the application example described above, the pairs of the first fixing portions and the third fixing portions and the pairs of the second fixing portions and the third fixing portions are each preferably provided with a restriction unit that restricts any shift in a direction perpendicular to the projection direction, the restriction units provided in at least one of the fixing portions of each of the pairs.

According to the projector described above, the restriction units allow a shift in the direction parallel to the projection direction but restrict any shift in the direction perpendicular to the projection direction, whereby the projector achieved in the present application example can suppress displacement of the projection position.

APPLICATION EXAMPLE 6

In the projector according to the application example described above, the restriction units preferably include elongated holes provided in the pairs of the first fixing portions and the third fixing portions and the pairs of the second fixing portions and the third fixing portions but in one of the fixing portions of each of the pairs and having a longitudinal direction that coincides with the projection direction, screw members that are inserted into the elongated holes and restrict any shift in directions perpendicular to the projection direction including a lateral direction of the elongated holes, and threaded holes which are provided in the other one of the fixing portions of each of the pairs and into which the screw members are screwed.

According to the projector described above, since the restriction units can be formed of the elongated holes, the screw members, and the threaded holes, a structure that allows a shift in the direction parallel to the projection direction but restricts any shift in the directions perpendicular to the projection direction can be readily achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be described below with reference to the drawings.

Figure 1:
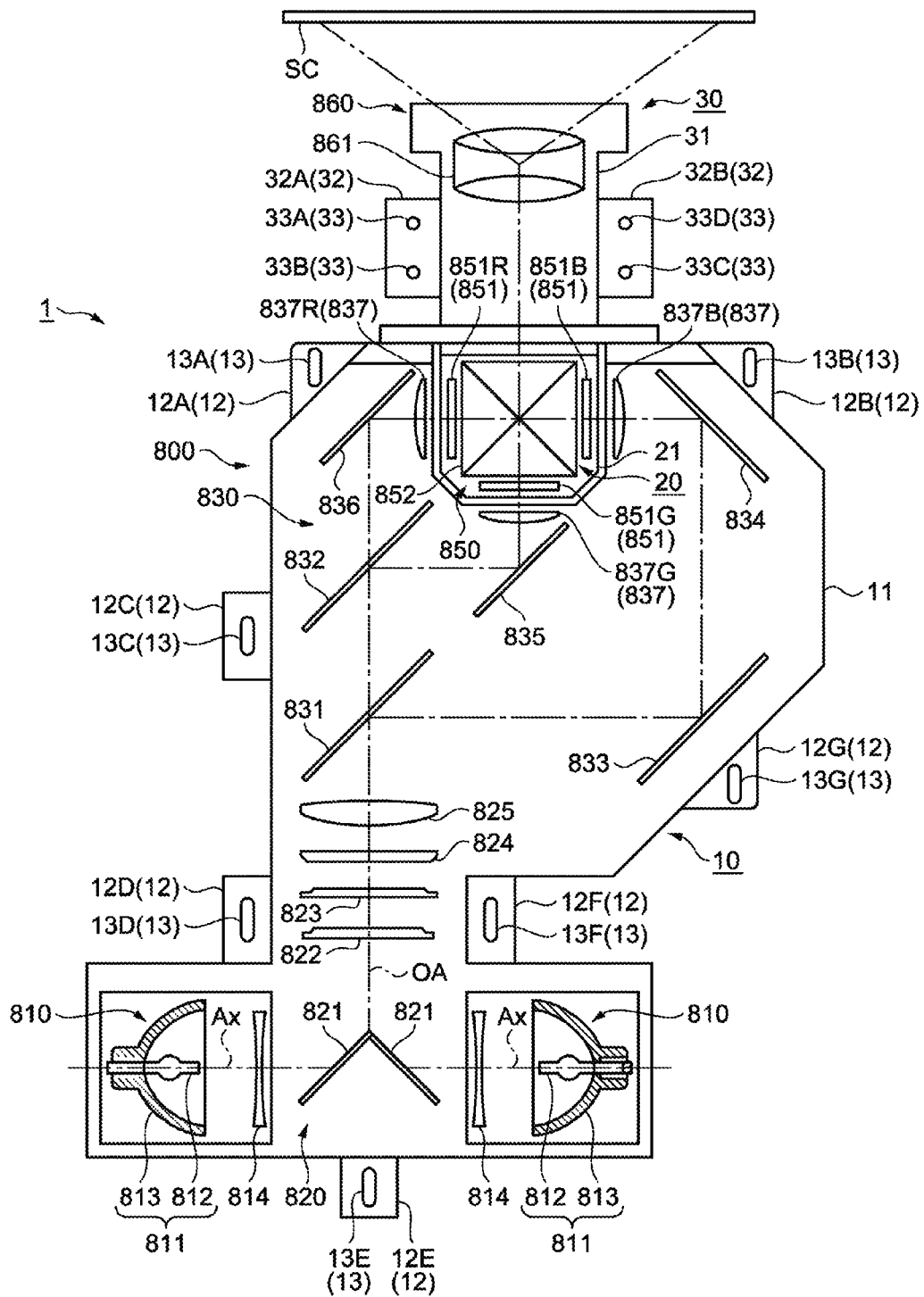
FIG. 1 diagrammatically shows the configuration of an optical system of a projector according to an embodiment.

FIG. 1 diagrammatically shows the configuration of an optical system 800 of a projector 1 according to the embodiment. In FIG. 1, illumination unit fixing portions 12 and projection unit fixing portions 32 are also diagrammatically drawn for convenience of the following description.

The configuration and operation of the optical system 800 of the projector 1 will be described with reference to FIG. 1.

The projector 1 according to the present embodiment is an electronic apparatus in which light outputted from each light source apparatus 810 is modulated by liquid crystal panels 851 (851R, 851G, and 851B) as a light modulator in accordance with image information and the modulated light (image light) is projected through a projection lens 861 onto a projection surface (such as screen SC). The optical system 800 for performing the operation described above is provided in the projector 1.

The projector 1 further includes a controller (not shown) that oversees and controls the overall operation of the projector 1, a power supply (not shown) that supplies the controller and other components with electric power, and a cooler (not shown) that cools the interior of the projector 1, as well as the optical system 800 described above.

The optical system 800 of the projector 1 includes a light source apparatus 810, an illumination system 820, a color separation system 830, an electro-optic system 850, and a projection system 860.

The light source apparatus 810 is formed of two (a pair of) light source apparatus 810 in the present embodiment. The pair of light source apparatus 810 each include a light source apparatus body 811 and a parallelizing lens 814 and are configured in the same manner. The light source apparatus body 811 includes a discharge-type light source 812 and a reflector 813. The pair of light source apparatus 810 are so disposed that optical axes Ax of the light sources 812 substantially coincide with each other and the pair of light source apparatus 810 face each other and sandwich a pair of reflection mirrors 821. Each of the pair of light source apparatus 810 is further so configured that light fluxes emitted from the light source 812 are reflected off the reflector 813 and then so aligned with each other by the parallelizing lens 814 that the light fluxes travel in the same direction in parallel to the optical axis Ax toward the reflection mirror 821. Each of the light source apparatus 810 in the present embodiment employs an ultrahigh-pressure mercury lamp.

The illumination system 820 includes the pair of reflection mirrors 821, a first lens array 822, a second lens array 823, a polarization conversion element 824, and a superimposing lens 825. The pair of reflection mirrors 821 are disposed in correspondence with the pair of light source apparatus 810, respectively, and reflect the light outputted from the light source apparatus 810 in a direction substantially perpendicular to the optical axes Ax (direction toward first lens array 822). The first lens array 822 is formed of a plurality of lenslets arranged in a matrix. Each of the lenslets divides the light outputted from the light source apparatus 810 and reflected off the reflection mirrors 821 into sub-light fluxes and outputs the sub-light fluxes in the direction along an illumination optical axis OA. The second lens array 823 is formed of lenslets arranged in a matrix in correspondence with the sub-light fluxes having exited out of the lenslets of the first lens array 822. The second lens array 823 causes the sub-light fluxes having exited out of the first lens array 822 to exit toward the superimposing lens 825. The illumination optical axis OA is a central axis of the light outputted toward illumination receiving areas.

The polarization conversion element 824 has a function of aligning the sub-light fluxes having exited out of the second lens array 823, which are randomly polarized light fluxes, with each other into substantially one type of polarized light fluxes usable by each of the liquid crystal panels 851. The sub-light fluxes converted by the polarization conversion element 824 into substantially one type of polarized light fluxes are substantially superimposed on each other by the superimposing lens 825 on the surface of each of the liquid crystal panels 851 so that the illumination receiving area is illuminated at uniform illuminance.

The color separation system 830 includes dichroic mirrors 831 and 832, reflection mirrors 833 to 836, and collector lenses 837 (837R, 837G, and 837B). The dichroic mirror 831 transmits a red (R) light component and a green (G) light component and reflects a blue (B) light component. The dichroic mirror 832 transmits the R light component and reflects the G light component.

The reflection mirror 833 reflects the B light component reflected off the dichroic mirror 831, and the reflected B light component is further reflected off the reflection mirror 834 and incident on the collector lens 837B for B light. The B light incident on the collector lens 837B is parallelized and incident on an image formation area (illumination receiving area) of the liquid crystal panel 851B for B light. The reflection mirror 835 reflects the G light component reflected off the dichroic mirror 832, and the reflected G light component is incident on the collector lens 837G for G light. The G light incident on the collector lens 837G is parallelized and incident on the image formation area (illumination receiving area) of the liquid crystal panel 851G for G light. The reflection mirror 836 reflects the R light component having passed through the dichroic mirror 832, and the transmitted R light component is incident on the collector lens 837R for R light. The R light incident on the collector lens 837R is parallelized and incident on the image formation area (illumination receiving area) of the liquid crystal panel 851R for R light.

Since the optical path length of the blue light is longer than the optical path length of each of the other color light fluxes, a relay lens, although not shown, is disposed in each of the spaces between the dichroic mirror 831 and the reflection mirror 833 and between the reflection mirror 833 and the reflection mirror 834 to prevent the light from diverging or light usage efficiency from decreasing.

The electro-optic system 850 includes the liquid crystal panels 851 (851R, 851G, and 851B), a cross dichroic prism 852, and other components. The electro-optic system 850 modulates the color light fluxes incident thereon in accordance with image information to form color image light.

Although not shown, a light-incident-side polarizer is disposed on the light incident side of each of the liquid crystal panels 851, and a light-exiting-side polarizer is disposed between each of the liquid crystal panels 851 and the cross dichroic prism 852. The light-incident-side polarizers, the liquid crystal panels 851, and the light-exiting-side polarizers form a light modulator that performs optical modulation on the color light fluxes incident thereon.

Each of the liquid crystal panels 851 is a transmissive panel in which a pair of transparent glass substrates encapsulate and seal a liquid crystal material, which is an electro-optic substance. For example, each of the liquid crystal panels 851 uses a polysilicon TFT as a switching device to modulate the polarization direction of one type of linearly polarized light having exited out of each of the light-incident-side polarizers in accordance with a given image signal.

The cross dichroic prism 852 combines optical images formed by the color light fluxes modulated and then outputted through the light-exiting-side polarizers with one another to form color image light. The cross dichroic prism 852 is formed by bonding four rectangular prisms and thus has a substantially square shape in a plan view. Optical multilayer films are formed along the substantially X-shaped interfaces between the bonded rectangular prisms. The optical multilayer films deflect the red light and the blue light in such a way that the red light and the blue light travel in the same direction as the green light. The three color light fluxes are thus combined with one another. The combined color image light is caused to exit toward the projection lens 861.

The projection system 860 includes the projection lens 861. The projection lens 861 is formed of a combination of a plurality of lenses and enlarges and projects the modulated and combined image light from the electro-optic system 850 to form a projection image (color image) on the screen SC or any other projection surface.

Figure 2:
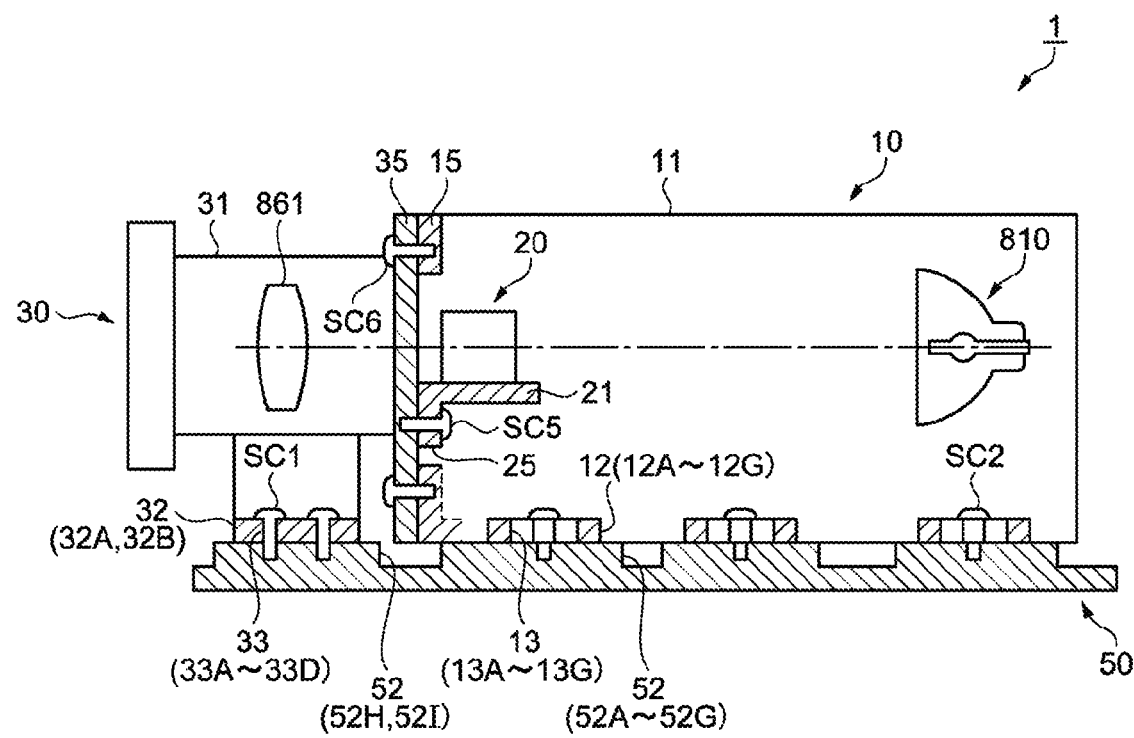
FIG. 2 is a cross-sectional view diagrammatically showing a structure in which constituent members of the projector are fixed.
Figure 3:
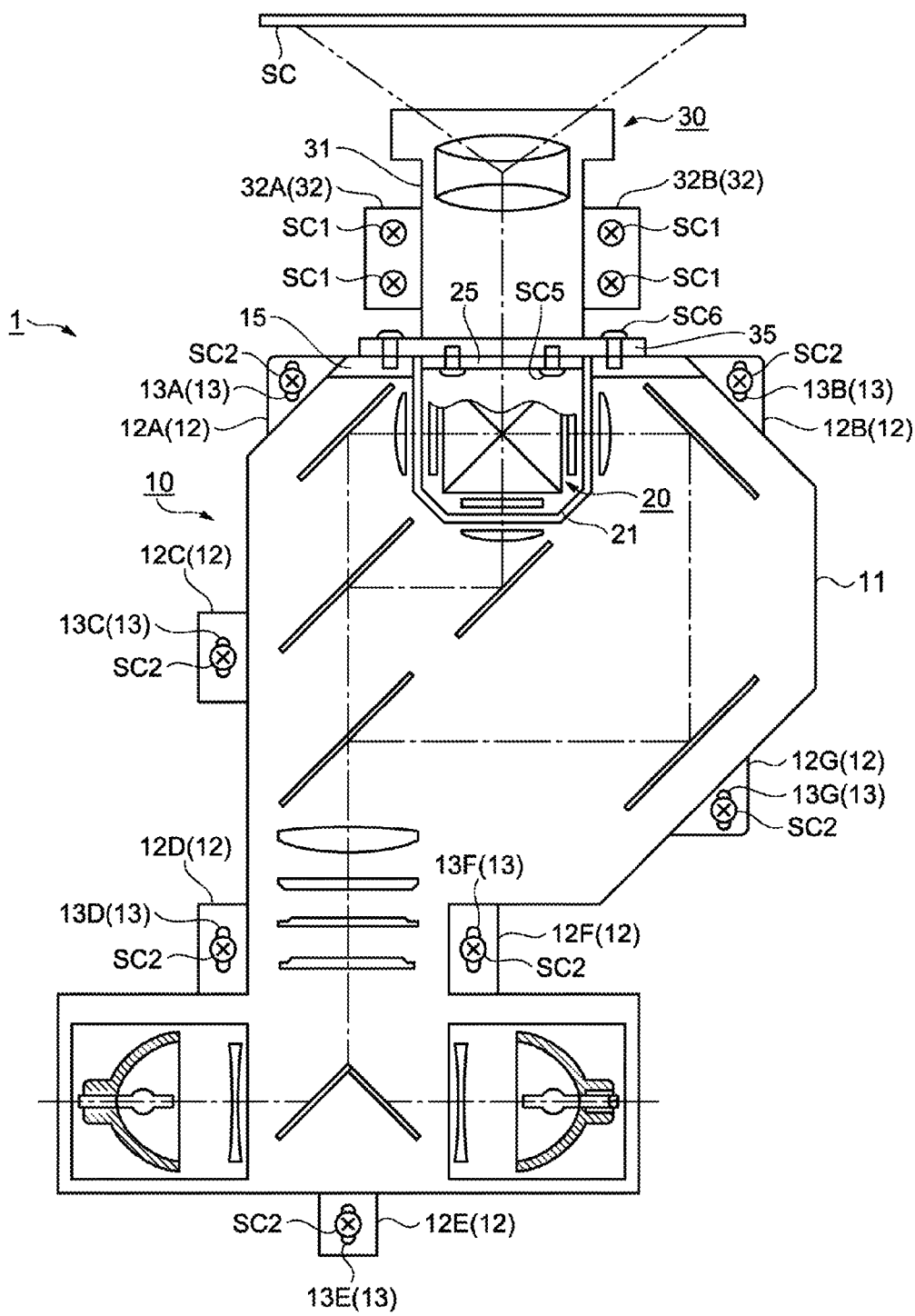
FIG. 3 is a plan view showing fixing portions of the constituent member.

FIG. 2 is a cross-sectional view diagrammatically showing a structure in which constituent members of the projector 1 are fixed. FIG. 3 is a plan view showing fixing portions of the constituent members. The configuration of the projector 1 will be described with reference to FIGS. 1 to 3.

The projector 1 includes the following components as primary constituent members in the present embodiment: an illumination unit 10; an image formation unit 20; a projection unit 30; and a base frame 50. An exterior enclosure that forms the exterior of the projector 1, legs that support the exterior enclosure, and other components are omitted.

The illumination unit 10, which is diagrammatically shown in FIGS. 1 and 2, is an optical unit that accommodates the light source apparatus 810, the illumination system 820, and the color separation system 830 in the optical system 800. The illumination unit 10 includes an illumination unit enclosure 11, which accommodates the optical elements that form the optical systems in predetermined positions.

The image formation unit 20 is an optical unit in which the electro-optic system 850 in the optical system 800 is placed. The image formation unit 20 includes an image formation unit enclosure 21, which places the optical elements that form the electro-optic system 850 in predetermined positions.

The projection unit 30 is an optical unit that accommodates the projection system 860 in the optical system 800. The projection unit 30 includes a projection unit enclosure 31, which accommodates the optical elements (plurality of lenses) that form the projection system 860 (projection lens 861) in predetermined positions.

The image formation unit 20 is coupled to the projection unit 30, as shown in FIGS. 2 and 3. In the present embodiment, a fixing portion 25 provided in the image formation unit 20 (image formation unit enclosure 21) is fixed to a fixing portion 35 in the projection unit 30 (projection unit enclosure 31) with screws SC5. The image formation unit 20 and the projection unit 30 are thus coupled to and integrated with each other.

Specifically, the fixing portion 25 in the image formation unit 20 is so provided as part of the image formation unit enclosure 21 that the fixing portion 25 is substantially perpendicular to the projection direction. In the present embodiment, four holes (not shown) are formed in the fixing portion 25. The fixing portion 35 in the projection unit 30 is so provided as part of the projection unit enclosure 31 that the fixing portion 35 faces the fixing portion 25 and is substantially perpendicular to the projection direction, and four threaded holes (not shown) are so formed in the fixing portion 35 that they face the four holes in the fixing portion 25. The screws SC5 are then inserted into the holes in the fixing portion 25 and screwed into the corresponding threaded holes in the fixing portion 35. The image formation unit 20 is thus coupled to the projection unit 30.

The illumination unit 10 is coupled to the projection unit 30, as shown in FIGS. 2 and 3. In the present embodiment, a fixing portion 15 in the illumination unit 10 (illumination unit enclosure 11) is fixed to the fixing portion 35 in the projection unit 30 (projection unit enclosure 31) with screws SC6. The illumination unit 10 is thus coupled to and integrated with the projection unit 30.

Specifically, the fixing portion 35 in the projection unit 30 is so provided as part of the projection unit enclosure 31 that the fixing portion 35 is substantially perpendicular to the projection direction. In the present embodiment, four holes (not shown) are formed in the fixing portion 35. The fixing portion 15 in the illumination unit 10 is so provided as part of the illumination unit enclosure 11 that the fixing portion 15 faces the fixing portion 35 and is substantially perpendicular to the projection direction, and four threaded holes (not shown) are so formed in the fixing portion 15 that they face the four holes in the fixing portion 35. The screws SC6 are then inserted into the holes in the fixing portion 35 and screwed into the corresponding threaded holes in the fixing portion 15. The illumination unit 10 is thus coupled to the projection unit 30.

The projection unit 30 is thus coupled not only to the image formation unit 20 but also to the illumination unit 10.

The illumination unit enclosure 11 has illumination unit fixing portions 12 as first fixing portions, which extend in the horizontal direction from the outer circumferential side surface of the illumination unit enclosure 11, as shown in FIGS. 1 and 3. The illumination unit fixing portions 12 are arranged at substantially equal intervals along the outer circumference of the illumination unit enclosure 11. The illumination unit fixing portions 12 are portions that fix the illumination unit 10 to the base frame 50, which will be described later, and hold the illumination unit 10 on the base frame 50.

The illumination unit fixing portions 12 are formed of illumination unit fixing portions 12A to 12G, which hold the illumination unit 10 on the base frame 50 in such a way that the illumination unit 10 is shiftable in the direction parallel to the projection direction.

The projection unit enclosure 31 has projection unit fixing portions 32 as second fixing portions, which extend in the horizontal direction from the outer circumferential side surface of the projection unit enclosure 31, as shown in FIGS. 1 to 3. The projection unit fixing portions 32 are portions that fix the projection unit 30 to the base frame 50, which will be described later. Specifically, the projection unit fixing portions 32 are formed of projection unit fixing portions 32A and 32B.

The base frame 50 is a member that fixes (holds) the illumination unit 10 and the projection unit 30, as shown in FIG. 2. The base frame 50 has base fixing portions 52 as third fixing portions in correspondence with the illumination unit fixing portions 12 and the projection unit fixing portions 32. In the present embodiment, the base fixing portions 52 include base fixing portions 52A to 52G formed in correspondence with the illumination unit fixing portions 12A to 12G. The base fixing portions 52 further include base fixing portions 52H and 52I formed in correspondence with the projection unit fixing portions 32A and 32B.

The base fixing portions 52H and 52I fix the projection unit fixing portions 32A and 32B with screws SC1, which will be described later, as shown in FIG. 2. The base fixing portions 52A to 52G hold the illumination unit fixing portions 12A to 12G with screws SC2, which will be described later, in such a way that the illumination unit fixing portions 12A to 12G are shiftable in the direction parallel to the projection direction.

The screws SC1 are configured in the same manner as the screws SC5 and SC6 described above. The projection unit fixing portions 32A and 32B have holes 33, into which the screws SC1 are inserted, as shown in FIGS. 1 and 2. Specifically, the projection unit fixing portion 32A has two holes 33A and 33B, and the projection unit fixing portion 32B has two holes 33C and 33D, as shown in FIG. 1. In the present embodiment, the screws SC1 are inserted into the holes 33A to 33D and screwed into threaded holes (not shown) in the base fixing portions 52H and 52I, which are formed in correspondence with the projection unit fixing portions 32A and 32B (holes 33A to 33D). The projection unit fixing portions 32A and 32B are thus fixed to the base fixing portions 52H and 52I.

Figure 4A:
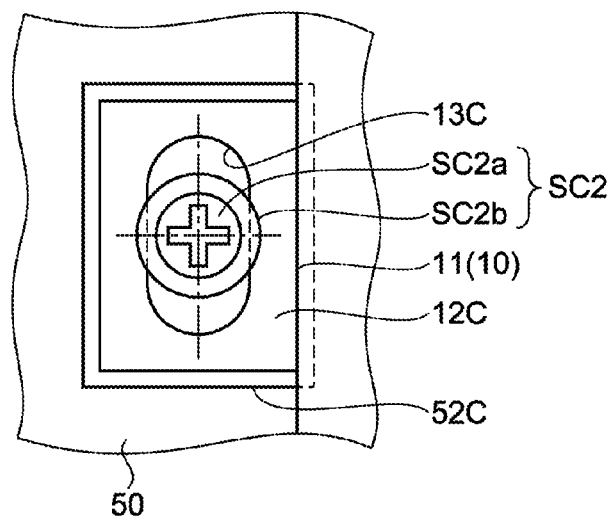
FIGS. 4A to 4C are a plan view and cross-sectional views diagrammatically showing a structure in which a fixing portion is shiftably held.
Figure 4B:
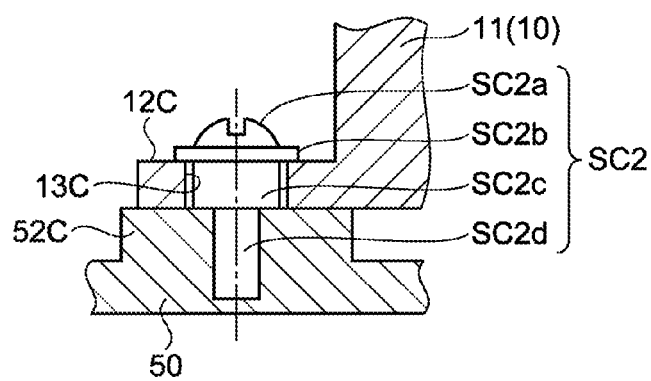
Figure 4C:
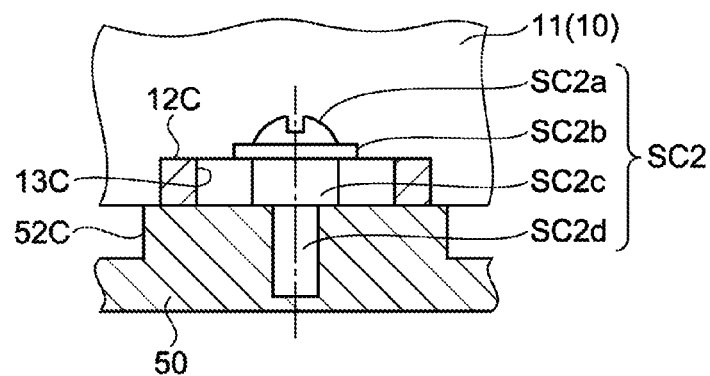

FIGS. 4A to 4C are a plan view and cross-sectional views diagrammatically showing a structure in which a fixing portion is shiftably held. FIG. 4A is a plan view. FIG. 4B is a cross-sectional view taken along a plane perpendicular to the projection direction. FIG. 4C is a cross-sectional view taken along a plane extending in the projection direction. In the present embodiment, in which the illumination unit fixing portions 12A to 12G are shiftably held on the base fixing portions 52A to 52G, the illumination unit fixing portion 12C and the base fixing portion 52C are picked up and described below for ease of description. FIGS. 4A to 4C therefore show a structure in which the illumination unit fixing portion 12C is shiftably held on the base fixing portion 52C.

A structure in which each of the illumination unit fixing portions 12 other than the illumination unit fixing portion 12C (12A, 12B, 12D to 12G) is shiftably held on the corresponding one of the base fixing portions 52 (52A, 52B, 52D to 52G) is the same as the structure in which the illumination unit fixing portion 12C is shiftably held on the base fixing portion 52C.

The structure in which the illumination unit fixing portion 12C is shiftably held on the base fixing portion 52C will be described with reference to FIG. 1 and FIGS. 4A to 4C.

The illumination unit fixing portion 12C has an elongated hole 13C, the longitudinal direction of which coincides with the projection direction, as shown in FIGS. 1 and 4A. The elongate hold 13C is a through hole. The base fixing portion 52C, which is formed in correspondence with the illumination unit fixing portion 12C, is located below the illumination unit fixing portion 12C. The base fixing portion 52C has a threaded hole (not shown) into which one of the screws SC2, which will be described later, is screwed. In the present embodiment, the elongated hole 13C, the screw SC2, and the threaded hole form a restriction unit.

Each of the screws SC2 as a screw member is what is called a stepped screw in the present embodiment. Each of the screws SC2 is formed of a screw head portion SC2a having a flange portion SC2b, a step portion SC2c formed below the flange portion SC2b, and a screw portion SC2d formed below the step portion SC2c, as shown in FIG. 4B.

As a method for assembling the illumination unit 10, the image formation unit 20, and the projection unit 30 to the base frame 50, the image formation unit 20 is first coupled to the projection unit 30. The projection unit 30 to which the image formation unit 20 has been coupled is then coupled to the illumination unit 10. The methods for coupling these units to each other have been described above. In this state, the projection unit 30 and the illumination unit 10 are then placed on the base frame 50. The projection unit 30 is then fixed to the base frame 50 in the manner described above. The assembly described above allows all the illumination unit fixing portions 12 including the illumination unit fixing portion 12C to be located on the corresponding base fixing portions 52.

The illumination unit fixing portion 12C is then held on the base fixing portion 52C. Specifically, one of the screws SC2 in the present embodiment is inserted into the elongated hole 13C provided in the illumination unit fixing portion 12C, and the screw portion SC2d is screwed into the threaded hole (not shown) provided in the base fixing portion 52C.

The step portion SC2c of the screw SC2 is thus located in the elongated hole 13C, as shown in FIGS. 4B and 4C. The step portion SC2c is so formed that it has a diameter slightly smaller than the lateral length (width) of the elongated hole 13C, as shown in FIG. 4B. Therefore, when the illumination unit 10 and the base frame 50 expand due to an increase in temperature, the illumination unit fixing portion 12C is restricted not to shift relative to the base fixing portion 52C in a direction perpendicular to the projection direction (lateral direction of elongated hole 13C in this case).

The longitudinal length of the elongated hole 13C in the present embodiment is set to be longer than or equal to a length that accommodates the amount of expansion derived in consideration of the amount of increase in the length of the projection unit enclosure 31 and the illumination unit enclosure 11 in the direction parallel to the projection direction due to an increase in temperature and the amount of increase in the length of the base frame 50 in the direction parallel to the projection direction due to the increase in temperature. Specifically, the longitudinal length of the elongated hole 13C is set to be longer than or equal to a length that accommodates the amount of expansion derived in consideration of the amount of increase in the length from the projection unit fixing portions 32A and 32B, which are fixed and hence serve as a reference, to the illumination unit fixing portion 12C due to an increase in temperature and the amount of increase in the length from the base fixing portions 52H and 52I, which are fixed and hence serve as a reference, to the base fixing portion 52C. Therefore, even when the projection unit 30, the illumination unit 10, and the base frame 50 expand due to an increase in temperature, a shift along the elongated hole 13C (illumination unit fixing portion 12C) and the base fixing portion 52C in the direction parallel to the projection direction is allowed.

The longitudinal length of the elongated hole 13 in each of the illumination unit fixing portions 12 other than the illumination unit fixing portion 12C is also set to be longer than or equal to a length that accommodates the amount of expansion derived in consideration of the amount of increase in the length from the projection unit fixing portions 32A and 32B, which are fixed and hence serve as a reference, to the illumination unit fixing portion 12 due to an increase in temperature and the amount of increase in the length from the base fixing portions 52H and 52I, which are fixed and hence serve as a reference, to the corresponding base fixing portion 52 due to the increase in temperature.

Further, since the flange portion SC2b of the screw head portion SC2a has a diameter greater than the lateral length (width) of the elongated hole 13C, the flange portion SC2b covers an upper surface portion of the illumination unit fixing portion 12C in the lateral direction of the elongated hole 13C and limits the amount of upward shift of the illumination unit fixing portion 12C away from the base fixing portion 52C. The limitation is roughly set to allow the amount of expansion of the illumination unit fixing portion 12C due to an increase in temperature. The flange portion SC2b therefore lightly presses the illumination unit fixing portion 12C. When the illumination unit 10 and the base frame 50 expand due to an increase in temperature, the illumination unit fixing portion 12C is restricted not to shift relative to the base fixing portion 52C in a direction perpendicular to the projection direction (upward in this case).

The configuration and the assembly described above allow the illumination unit fixing portion 12C to be held relative to the base fixing portion 52C shiftably in the direction parallel to the projection direction, which coincides with the longitudinal direction of the elongated hole 13C, but restrict the illumination unit fixing portion 12C not to shift relative to the base fixing portion 52C in the directions perpendicular to the projection direction including the lateral direction of the elongated hole 13C. In other words, the base fixing portion 52C is held relative to the illumination unit fixing portion 12C shiftably in the direction parallel to the projection direction, which coincides with the longitudinal direction of the elongated hole 13C, but is restricted not to shift relative to the illumination unit fixing portion 12C in the directions perpendicular to the projection direction including the lateral direction of the elongated hole 13C.

The above description has been made of the configuration and the assembling method in which the illumination unit fixing portion 12C is held on the base fixing portion 52C, and the same holds true for the other illumination unit fixing portions 12 (12A, 12B, 12D to 12G) and the corresponding other base fixing portions 52 (52A, 52B, 52D to 52G).

The configuration and the assembly described above allow the projection unit fixing portions 32A and 32B in the projection unit 30 to be fixed to the base fixing portions 52H and 52I of the base frame 50. The illumination unit fixing portions 12A to 12G in the illumination unit 10 are held on the base fixing portions 52A to 52G of the base frame 50 shiftably in the direction parallel to the projection direction, which coincides with the longitudinal direction of the elongated holes 13A to 13G, but are restricted not to shift relative to the base fixing portions 52A to 52G of the base frame 50 in the directions perpendicular to the projection direction including the lateral direction of the elongated holes 13A to 13G.

In the present embodiment, the elongated holes 13A to 13G in the illumination unit fixing portions 12, the screws SC2, and the threaded holes in the base fixing portions 52 (52A to 52G) form restriction units.

Figure 5:
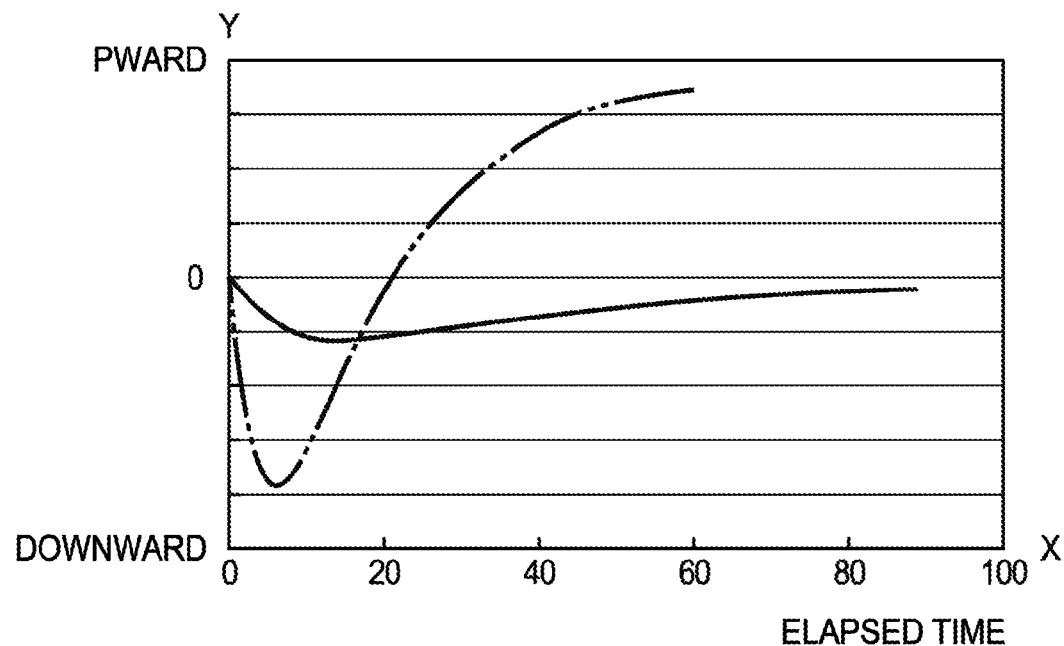
FIG. 5 shows a change in a projection position due to a change in temperature.
Figure 6A:
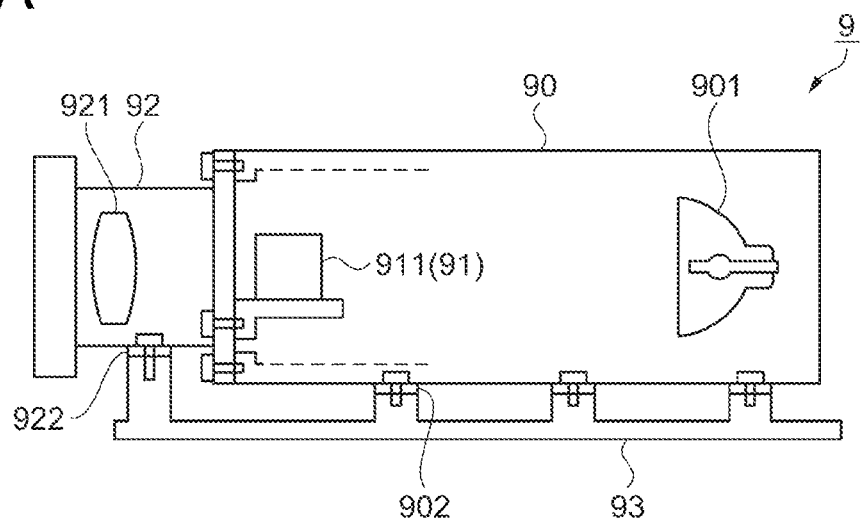
FIGS. 6A to 6C are cross-sectional views diagrammatically showing a schematic configuration of a projector of related art.
Figure 6B:
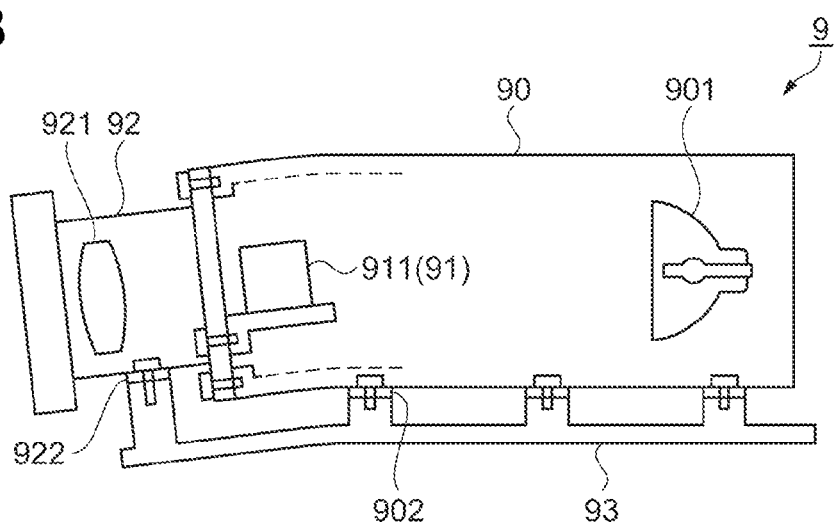
Figure 6C:
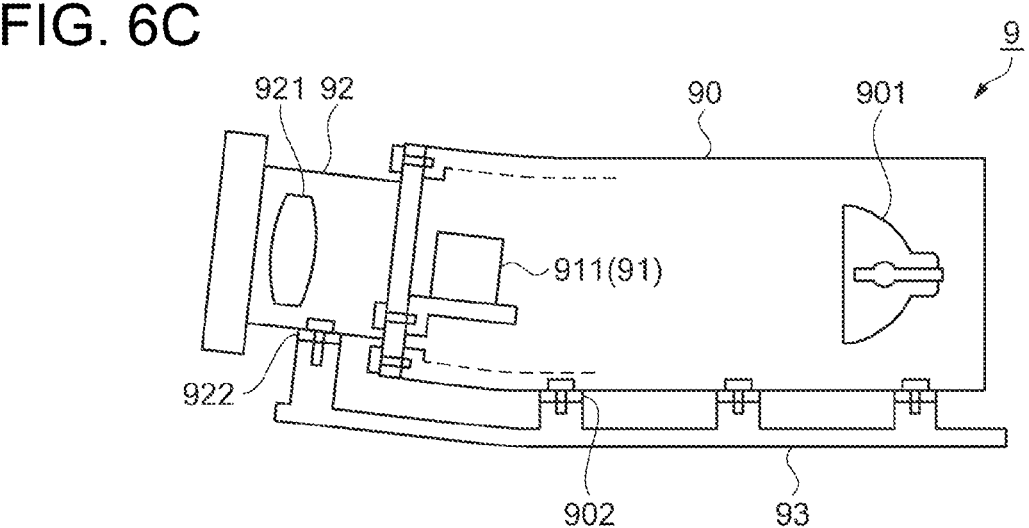
Figure 7:
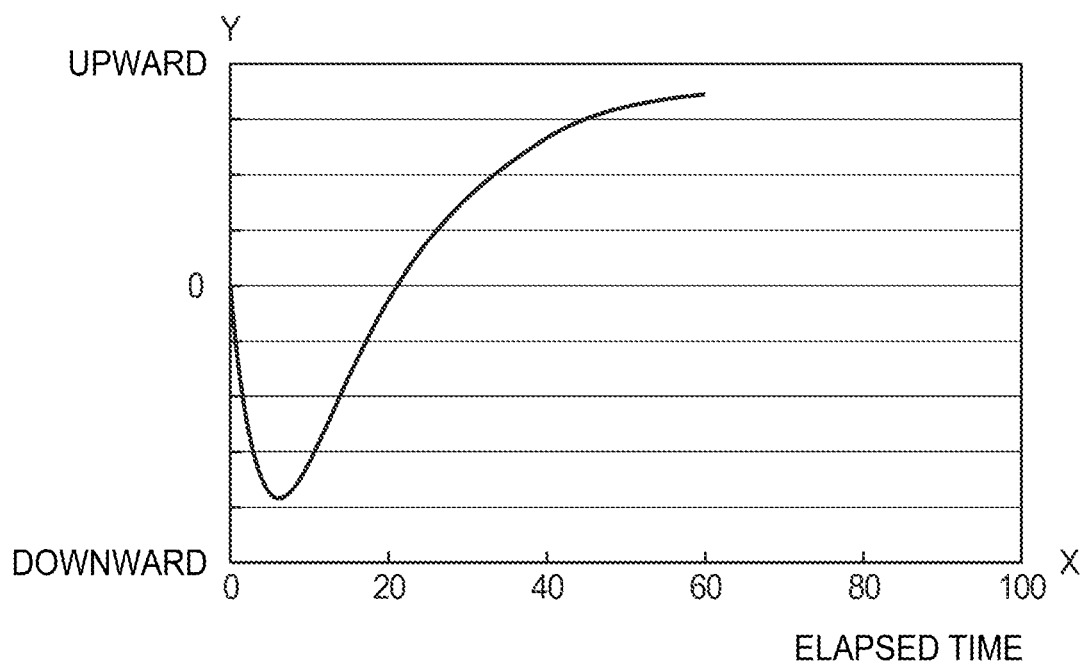
FIG. 7 shows a change in the projection position due to an increase in temperature in the projector of related art.

FIG. 5 shows a change in the projection position due to an increase in temperature in the projector 1. Specifically, FIG. 5 shows a result of measurement of the amount of change in the projection position due to an increase in temperature in a case where the projector 1 according to the present embodiment configured by using the structure in which the illumination unit 10, the image information unit 20, the projection unit 30, and the base frame 50 according to the present embodiment are fixed to each other is actually operated (to perform projection). The solid line in FIG. 5 shows the result. FIG. 5 also shows the result of the measurement made on the structure of related art and shown in FIG. 7 in the form of a chain double-dashed line for comparison between the structure of the present embodiment and the structure of related art.

In FIG. 5, the horizontal axis (X axis) represents elapsed time (in minutes) immediately after the projection starts, and the vertical axis (Y axis) represents the amount of change in (amount of displacement of) the projection position immediately after the projection starts. The graph in FIG. 5 is drawn with reference to the projection position at the time when the projection starts (0 minute). Specifically, the Y axis shown in FIG. 5 represents the amount of change in (amount of displacement of) the projection position in the form of the number of shifted pixels, but the number of pixels and other parameters are not numerically shown.

In a first stage after the projection starts, an increase in temperature of the illumination unit 10 having the light source apparatus 810, which causes expansion of the illumination unit enclosure 11, which forms the illumination unit 10, and a decrease in the modulus of elasticity of the material of the illumination unit enclosure 11, and the self-weight of the projection unit 30 deform the projection unit 30 in such a way that it is gradually inclined downward. The projection position therefore gradually shifts (is displaced) downward immediately after the projection starts, as shown in FIG. 5. Thereafter, when the temperature of the base frame 50 increases, the projection unit 30 conversely deforms in such a way that it is inclined upward.

After the projection starts, the projection position shifts downward and reaches the lowest position in about 15 minutes, as shown in FIG. 5. The amount of shift (amount of displacement) is, however, about one-fourth the amount of shift in related art, which means that the downward shift is suppressed. The projection position then conversely shifts (is displaced) upward. In the upward shift, the projection position approaches the reference projection position, unlike the upward shift in related art in which the projection position shifts upward beyond the reference projection position, which means that the upward shift is suppressed as compared with the upward shift in related art.

As described above, comparison of the overall amount of shift (overall amount of displacement) of the projection position between the configuration of the present embodiment and the configuration of related art shows that the amount of shift in the configuration of the present embodiment is smaller than the amount of shift in the configuration of related art. It is further ascertained that when the configuration of the present embodiment is used, although an initial downward shift occurs, the projection position returns to (approaches) the reference projection position. It is therefore ascertained that the configuration of the present embodiment reduces the amount of shift (amount of displacement) as compared with the configuration of related art.

According to the projector 1 of the present embodiment, the following advantageous effects are provided.

In the projector 1 according to the present embodiment, in the case where the projection unit 30 is fixed to the base frame 50, the projection unit fixing portions 32A and 32B provided in the projection unit 30 are fixed to the base fixing portions 52H and 52I. The illumination unit fixing portions 12A to 12G provided in the illumination unit 10 are held on the base fixing portions 52A to 52G. The illumination unit fixing portions 12A to 12G can therefore shift in the direction parallel to the projection direction relative to the base fixing portions 52A to 52G with reference to the fixed projection unit fixing portions 32A and 32B.

As a result, deformation of the constituent members (illumination unit 10, projection unit 30, and base frame 50) that occurs when the temperatures of the constituent members increase can be maintained at an acceptable level with reference to the fixed projection unit fixing portions 32A and 32B. Deformation of the constituent members due to a change in temperature can therefore be accommodated, whereby the projector 1 achieved in the present embodiment can suppress displacement of the projection position.

In the projector 1 according to the present embodiment, the restriction units are formed of the elongated holes 13A to 13G in the illumination unit fixing portions 12, the screws SC2, and the threaded holes in the base fixing portions 52 (52A to 52G). The restriction units allow the constituent members (illumination unit 10, projection unit 30, and base frame 50) that deform when the temperatures of the constituent members increase to shift in the direction parallel to the projection direction but restrict shift of the constituent members in the directions perpendicular to the projection direction, whereby the projector 1 achieved in the present embodiment can suppress displacement in the projection position.

In the projector 1 according to the present embodiment, the restriction units, which are formed of the elongated holes 13A to 13G in the illumination unit fixing portions 12, the screws SC2, and the threaded holes in the base fixing portions 52 (52A to 52G), can readily provide a structure in which shift in the direction parallel to the projection direction is allowed but shift in the directions perpendicular to the projection direction is restricted.

The invention is not limited to the embodiment described above, and a variety of changes, improvements, and other modifications can be made thereto to the extent that they do not depart from the substance of the invention. Variations follow.

In the projector 1 according to the embodiment described above, the projection unit 30 is fixed to the base frame 50, and the illumination unit 10 is shiftably held on the base frame 50. Specifically, the projection unit fixing portions 32A and 32B in the projection unit 30 are fixed to the base fixing portions 52H and 52I of the base frame 50, and the illumination unit fixing portions 12A to 12G in the illumination unit 10 are shiftably held on the base fixing portions 52A to 52G of the base frame 50. The configuration described above is not necessarily employed, and the illumination unit 10 may be fixed to the base frame 50 and the projection unit 30 may be shiftably held on the base frame 50.

In this case, the illumination unit fixing portions 12A to 12G may be fixed and the projection unit fixing portions 32 in the projection unit 30 may be shiftably held.

Among the illumination unit fixing portions 12, an illumination unit fixing portion 12 located in the vicinity of the projection unit 30 may be fixed and the other illumination unit fixing portions 12 may be shiftably held. Further, the projection unit fixing portions 32 in the projection unit 30 may be shiftably held.

The configuration of the variation described above will be schematically described by using the reference characters used in the present embodiment. Detailed fixing and holding configurations will not be described on the assumption that the same configurations as those in the present embodiment are applied.

Among the illumination unit fixing portions 12, the illumination unit fixing portions 12A and 12B located in the vicinity of the projection unit 30 are fixed to the base fixing portions 52A and 52B. The other illumination unit fixing portions 12C to 12G are shiftably held on the base fixing portions 52C to 52G. Further, the projection unit fixing portions 32A and 32B in the projection unit 30 are preferably shiftably held on the base fixing portions 52H and 52I.

In the configuration described above, with reference to the fixed illumination unit fixing portions 12A and 12B, the other illumination unit fixing portions 12C to 12G shift relative to the base fixing portions 52C to 52G in the direction parallel to the projection direction. Further, the projection unit fixing portions 32A and 32B shift in the direction parallel to the projection direction relative to the base fixing portions 52H and 52I with reference to the fixed illumination unit fixing portions 12A and 12B.

As a result, deformation of the constituent members that occurs when the temperatures of the constituent members increase can be maintained at an acceptable level with reference to the fixed illumination unit fixing portions 12A and 12B. Deformation of the constituent members due to a change in temperature can be accommodated, whereby the projector 1 achieved in the variation can suppress displacement of the projection position.

Further, in the variation described above, the restriction units including the elongated holes and provided in the combination of the illumination unit fixing portions 12C to 12G in the illumination unit 10 and the base fixing portions 52C to 52G of the base frame 50 and in the combination of the projection unit fixing portions 32A and 32B in the projection unit 30 and the base fixing portions 52H and 52I of the base frame 50 can restrict any shift in the directions perpendicular to the projection direction.

In the projector 1 according to the embodiment described above, the elongated holes 13 (13A to 13G) are provided in the illumination unit fixing portions 12A to 12G, and the threaded holes into which the screws SC2 are screwed are provided in the base fixing portions 52A to 52G. A converse configuration in which the elongated holes are provided in the base fixing portions 52A to 52G and the threaded holes are provided in the illumination unit fixing portions 12A to 12G may instead be employed. In this case, the screws SC2 may be inserted into the elongated holes provided in the base fixing portions 52A to 52G and screwed into the threaded holes provided in the illumination unit fixing portions 12A to 12G.

In the projector 1 according to the embodiment described above, the members that form the restriction units include the screws SC2, each of which has the step portion SC2c. The screws SC2 are not necessarily configured this way, and a cylindrical dowel having the function of the step portion SC2c of each of the screws SC2 may be provided on each of the base fixing portions 52A to 52G and caused to be located in the corresponding elongated hole 13 to restrict any shift in a direction perpendicular to the projection direction (lateral direction of elongated hole). In this case, a threaded hole may be provided in each of the dowels and a screw member having the flange portion SC2b may be screwed into the threaded hole for restriction of any upward shift.

In the projector 1 according to the embodiment described above, each of the screws SC2, which form the restriction units, is a stepped screw having the step portion SC2c integrated therewith. The screws SC2 are not necessarily configured this way, and the step portion SC2c may be a separate member.

In the projector 1 according to the embodiment described above, the three liquid crystal panels 851 are employed as the light modulator. The number of liquid crystal panels is not limited to three, and one liquid crystal panel configured to display a color image may be employed as the light modulator.

In the projector 1 according to the embodiment described above, each of the three liquid crystal panels 851 as the light modulator is a transmissive liquid crystal panel (light modulator). The light modulator is not limited to a transmissive light modulator and may instead be a reflective light modulator, a micromirror-type light modulator, or any other type of light modulator. An example of the micromirror-type light modulator can, for example, be a DMD (digital micromirror device) (trademark of Texas Instruments).

The entire disclosure of Japanese Patent Application No. 2014-056095, filed Mar. 19, 2014 is expressly incorporated by reference herein.

What is claimed is:

1. A projector in which light outputted from a light source apparatus is modulated by a light modulator in accordance with image information and the modulated light is projected through a projection lens onto a projection surface, the projector comprising:
   an illumination unit which has an optical system including the light source apparatus;
   an image formation unit which has an optical system including the light modulator;
   a projection unit which has an optical system including the projection lens, to which the image formation unit is coupled, and which is coupled to the illumination unit; and
   a base frame which fixes one of the illumination unit and the projection unit and shiftably holds the other to be shiftable in a direction parallel to a projection direction,
   wherein the projection unit is fixed to the illumination unit such that the other of the illumination unit and the projection unit that is shiftably held on the base frame is shiftable relative to the base frame without shifting relative to the one of the illumination unit and the projection unit fixed to the base frame.

2. The projector according to claim 1,
   wherein the illumination unit includes a plurality of first fixing portions fixed to or shiftably held on the base frame,
   the projection unit includes a plurality of second fixing portions fixed to or shiftably held on the base frame,
   the base frame includes a plurality of third fixing portions that are provided in correspondence with the first fixing portions and the second fixing portions and fix or shiftably hold the first fixing portions or the second fixing portions, and
   in a case where the projection unit is fixed to the base frame,
   the second fixing portions in the projection unit are fixed, and
   the first fixing portions in the illumination unit are shiftably held.

3. The projector according to claim 1,
   wherein the illumination unit includes a plurality of first fixing portions fixed to or shiftably held on the base frame,
   the projection unit includes a plurality of second fixing portions fixed to or shiftably held on the base frame,
   the base frame includes a plurality of third fixing portions that are provided in correspondence with the first fixing portions and the second fixing portions and fix or shiftably hold the first fixing portions or the second fixing portions, and
   in a case where the illumination unit is fixed to the base frame,
   the first fixing portions in the illumination unit are fixed, and
   the second fixing portions in the projection unit are shiftably held.

4. The projector according to claim 1,
   wherein the illumination unit includes a plurality of first fixing portions fixed to or shiftably held on the base frame,
   the projection unit includes a plurality of second fixing portions fixed to or shiftably held on the base frame,
   the base frame includes a plurality of third fixing portions that are provided in correspondence with the first fixing portions and the second fixing portions and fix or shiftably hold the first fixing portions or the second fixing portions, and
   in a case where the illumination unit is fixed to the base frame,
   among the plurality of first fixing portions in the illumination unit, a first fixing portion located in the vicinity of the projection unit is fixed and the other first fixing portions are shiftably held, and
   the second fixing portions in the projection unit are shiftably held.

5. The projector according to claim 2,
wherein the pairs of the first fixing portions and the third fixing portions and the pairs of the second fixing portions and the third fixing portions are each provided with a restriction unit that restricts any shift in a direction perpendicular to the projection direction, the restriction units provided in at least one of the fixing portions of each of the pairs.

6. The projector according to claim 5,
wherein the restriction units include
elongated holes provided in the pairs of the first fixing portions and the third fixing portions and the pairs of the second fixing portions and the third fixing portions but in one of the fixing portions of each of the pairs and having a longitudinal direction that coincides with the projection direction,
screw members that are inserted into the elongated holes and restrict any shift in directions perpendicular to the projection direction including a lateral direction of the elongated holes, and
threaded holes which are provided in the other one of the fixing portions of each of the pairs and into which the screw members are screwed.

7. A projector in which light outputted from a light source apparatus is modulated by a light modulator in accordance with image information and the modulated light is projected through a projection lens onto a projection surface, the projector comprising:
an illumination unit which has an optical system including the light source apparatus;
an image formation unit which has an optical system including the light modulator;
a projection unit which has an optical system including the projection lens, to which the image formation unit is coupled, and which is coupled to the illumination unit; and
a base frame which fixes one of the illumination unit and the projection unit and shiftably holds the other to be shiftable in a direction parallel to a projection direction,
wherein
the illumination unit includes a plurality of first fixing portions fixed to or shiftably held on the base frame,
the projection unit includes a plurality of second fixing portions fixed to or shiftably held on the base frame,
the base frame includes a plurality of third fixing portions that are provided in correspondence with the first fixing portions and the second fixing portions and fix or shiftably hold the first fixing portions or the second fixing portions, and
in a case where the projection unit is fixed to the base frame, the second fixing portions in the projection unit are fixed and the first fixing portions in the illumination unit are shiftably held.

8. A projector in which light outputted from a light source apparatus is modulated by a light modulator in accordance with image information and the modulated light is projected through a projection lens onto a projection surface, the projector comprising:
an illumination unit which has an optical system including the light source apparatus;
an image formation unit which has an optical system including the light modulator;
a projection unit which has an optical system including the projection lens, to which the image formation unit is coupled, and which is coupled to the illumination unit; and
a base frame which fixes one of the illumination unit and the projection unit and shiftably holds the other to be shiftable in a direction parallel to a projection direction,
wherein
the illumination unit includes a plurality of first fixing portions fixed to or shiftably held on the base frame,
the projection unit includes a plurality of second fixing portions fixed to or shiftably held on the base frame,
the base frame includes a plurality of third fixing portions that are provided in correspondence with the first fixing portions and the second fixing portions and fix or shiftably hold the first fixing portions or the second fixing portions, and
in a case where the illumination unit is fixed to the base frame, the first fixing portions in the illumination unit are fixed and the second fixing portions in the projection unit are shiftably held.

9. A projector in which light outputted from a light source apparatus is modulated by a light modulator in accordance with image information and the modulated light is projected through a projection lens onto a projection surface, the projector comprising:
an illumination unit which has an optical system including the light source apparatus;
an image formation unit which has an optical system including the light modulator;
a projection unit which has an optical system including the projection lens, to which the image formation unit is coupled, and which is coupled to the illumination unit; and
a base frame which fixes one of the illumination unit and the projection unit and shiftably holds the other to be shiftable in a direction parallel to a projection direction,
wherein
the illumination unit includes a plurality of first fixing portions fixed to or shiftably held on the base frame,
the projection unit includes a plurality of second fixing portions fixed to or shiftably held on the base frame,
the base frame includes a plurality of third fixing portions that are provided in correspondence with the first fixing portions and the second fixing portions and fix or shiftably hold the first fixing portions or the second fixing portions, and
in a case where the illumination unit is fixed to the base frame,
among the plurality of first fixing portions in the illumination unit, a first fixing portion located in the vicinity of the projection unit is fixed and the other first fixing portions are shiftably held, and
the second fixing portions in the projection unit are shiftably held.

* * * * *